US008695001B2

(12) United States Patent
Mathew et al.

(10) Patent No.: US 8,695,001 B2
(45) Date of Patent: Apr. 8, 2014

(54) LOADING SERVICES BASED ON A REQUEST AND SETTING PERMISSION LEVEL TO ENABLE EXECUTION OF COMMANDS OR SERVICES EXPOSED BASED ON A ROLE OF REQUESTER

(75) Inventors: Ashvin J Mathew, Kirkland, WA (US); Nicolae Surpatanu, London (GB); Hao Feng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1438 days.

(21) Appl. No.: 11/858,331

(22) Filed: Sep. 20, 2007

(65) Prior Publication Data

US 2009/0083740 A1     Mar. 26, 2009

(51) Int. Cl.
*G06F 9/46*     (2006.01)
*G06F 7/04*     (2006.01)
*G06F 21/00*    (2013.01)

(52) U.S. Cl.
USPC ............................ 718/102; 713/182; 726/2

(58) Field of Classification Search
None
See application file for complete search history.

(56) References Cited

U.S. PATENT DOCUMENTS

| | | | | |
|---|---|---|---|---|
| 5,634,127 A * | 5/1997 | Cloud et al. | | 719/313 |
| 5,990,892 A * | 11/1999 | Urbain | | 715/853 |
| 6,223,202 B1 * | 4/2001 | Bayeh | | 718/102 |
| 6,314,566 B1 * | 11/2001 | Arrouye et al. | | 717/148 |
| 6,360,243 B1 | 3/2002 | Lindsley et al. | | |
| 6,597,907 B1 * | 7/2003 | Pruitt et al. | | 455/423 |
| 6,598,067 B1 * | 7/2003 | Wydra et al. | | 718/100 |
| 6,907,406 B2 | 6/2005 | Suzuki | | |
| 7,518,620 B2 * | 4/2009 | Faraj | | 345/629 |
| 7,533,383 B2 * | 5/2009 | Bou-Ghannam et al. | | 718/102 |
| 7,856,517 B2 * | 12/2010 | Schneider et al. | | 710/62 |
| 7,930,735 B2 * | 4/2011 | Vigelette et al. | | 726/6 |
| 2002/0019885 A1 | 2/2002 | Sleeper | | |
| 2002/0184521 A1 * | 12/2002 | Lucovsky et al. | | 713/200 |
| 2003/0028685 A1 * | 2/2003 | Smith et al. | | 709/328 |
| 2003/0061090 A1 | 3/2003 | Marano | | |
| 2003/0220834 A1 | 11/2003 | Leung et al. | | |
| 2005/0234734 A1 * | 10/2005 | Chan et al. | | 705/1 |
| 2005/0246716 A1 * | 11/2005 | Smith et al. | | 719/315 |
| 2005/0257168 A1 * | 11/2005 | Cummins et al. | | 715/809 |
| 2005/0274798 A1 | 12/2005 | Bacastow | | |
| 2006/0242302 A1 | 10/2006 | Walker et al. | | |
| 2007/0022058 A1 | 1/2007 | Labrou et al. | | |

(Continued)

OTHER PUBLICATIONS

Faerber, et al., "Advanced Services of the GNIUS Project", Institute for Data Communications Sysytems, University of Siegen, pp. 5.

(Continued)

*Primary Examiner* — Abdullah Al Kawsar
(74) *Attorney, Agent, or Firm* — Damon Rieth; Jim Ross; Micky Minhas

(57) ABSTRACT

A service broker for asynchronous execution of software. The broker functions include dynamically loading working modules from a specified directory, publishing the working module commands, receiving service requests from clients, and upon successful authentication and authorization, dispatching the requests to module command queues for scheduling and execution. The modules are invoked in separate domains so that management functions can control the modules independently. A management application facilitates interactive user scheduling of the actions being invoked. This can also be accomplished automatically according to business rules, for example. The management application also facilitates checking the progress on an action that is occurring, displaying errors that occur during the command execution, results of an action can also be displayed, and scheduling of requests.

20 Claims, 12 Drawing Sheets

(56) References Cited

U.S. PATENT DOCUMENTS

2007/0088615 A1 4/2007 Meng
2007/0094085 A1 4/2007 Redmond et al.
2008/0271139 A1* 10/2008 Desai et al. ................. 726/17
2009/0049288 A1* 2/2009 Weissman ................. 712/245

OTHER PUBLICATIONS

"Mamut Point of Sale—Ideal for Small Businesses ", Mamut Software Ltd, 2007, pp. 1-2.
"Microsoft Offers New Integrated Retail Solution for Small-Business Retailers", Microsoft Corporation, Dec. 8, 2005, pp. 1.

* cited by examiner

Synchronization Status — 1100

Last synchronization: In progress

Results of last synchronization

| Information Type | Status | Errors |
|---|---|---|
| Customers | Synchronized | 31 |
| Items | Synchronized | 109 |
| Sales Taxes | Synchronized | 4 |
| Suppliers | Synchronized | 12 |
| Tax Authorities | Synchronized | 6 |
| Item Receipts | Synchronized | 0 |
| Transactions | Synchronized | 0 |

Total number of errors: 162

( View Error Report... )  ( Synchronize Now )  ( Close )

*FIG. 11*

LOADING SERVICES BASED ON A REQUEST AND SETTING PERMISSION LEVEL TO ENABLE EXECUTION OF COMMANDS OR SERVICES EXPOSED BASED ON A ROLE OF REQUESTER

BACKGROUND

The rapid evolution of software can leave many customers with patchwork systems for handling business data, programs and user access. While this may not critically impact the large industrial customers this can have a significant impact on the small business owner. For example, point-of-sale (POS) and front/back office business applications are very powerful tools to a small business owner as the combination offers elegant and exceptional ways to manage retail store front and back office operations. However, the POS and business applications are not integrated. Today, the front and back office operations are often broken forcing the user to manage these applications through cumbersome manual processes that take significant time away from business issues, and more importantly, do not provide convenient solutions for the user to analyze and improve performance.

Additionally, data synchronization and application interaction then becomes problematic when trying to get these systems to intercommunicate data and functions, for example. When systems do not effectively and efficiently interface, the user can be forced to manually make these processes work by interactively running programs, transferring data, writing additional patchwork programs, etc. This becomes exceedingly onerous where the business data and functionality can reside on distributed data systems or clients within one location or several locations.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is an extensible services broker for providing add-in services modules as solutions to the shortcomings in software systems. The services broker performs dynamic loading and unloading of add-in (or working) service modules for the handling of asynchronous application requests. The services broker also facilitates the scheduling of the service requests to the add-in modules from one or more internal and/or external clients.

In one exemplary implementation, the broker initializes at startup by loading one or more add-in service modules, publishing (exposing) commands of the loaded modules, and starts a broker worker thread. The loaded add-in modules publish commands that define the capabilities of the given module. For each service add-in module loaded in memory, a working thread and a queue are created. When the broker worker thread feeds the add-in command queue with one or more commands the associated add-in worker thread will wake up and execute the commands.

The add-in modules operate in separate domains such that management functions related to stopping module execution, pausing and resuming execution and shutting down the module will not affect other broker modules or operations. The broker management functions further include specifying scheduling parameters of the action being invoked. At least the following scheduling options are available (however, the manager can be configured for other scheduling options): invoke immediately, invoke periodically, and invoke when idle.

Management functions also facilitate checking the progress of an action that is occurring, displaying errors that occur during the command execution, and displaying a result of the action. The broker can dynamically unload a module that locks during command execution a command for more then a given period of time. Role-based security can also be specified for entities such as users and clients.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 11 illustrates an exemplary synchronization status panel.

DETAILED DESCRIPTION

Figure 1:
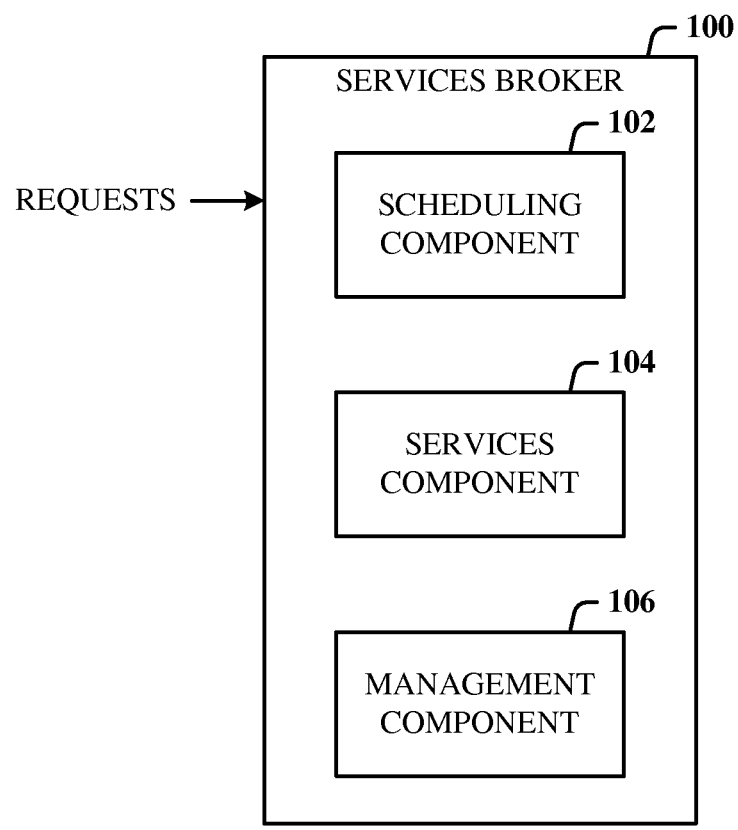
FIG. 1 illustrates a computer-implemented services broker system for servicing requests to disparate service providers of the system.

The disclosed architecture provides a reliable and secure services broker for executing asynchronous (e.g., on-demand) and scheduled tasks that span multiple data stores and systems. The broker runs a management application that maintains management functions at a minimum. A built-in extensibility scheme allows for add-in software components to run independently and in separate application domains. The add-in components have independent sets of tasks and can be invoked to execute code securely and independently of each other.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented services broker system 100 for servicing requests to disparate service providers. The system 100 includes a scheduling component 102 for scheduling the requests for the add-in services. Scheduling can be based on a need for request execution, important of the request relative to other requests, broker system performance, add-in module availability, and so on. Scheduling can also be according to business rules and policies invoked during request processing by the services broker system 100.

A services component 104 automatically invokes the services in response to receiving the service requests. Each of the services includes one or more service-specific actions that can be taken based on the request. A management component 106 manages access to the services. Management functions can include not only ensuring that the requester is authorized to access the specific service and/or specific service action, but also controlling add-in execution, etc., which are described in greater detail herein.

Figure 2:
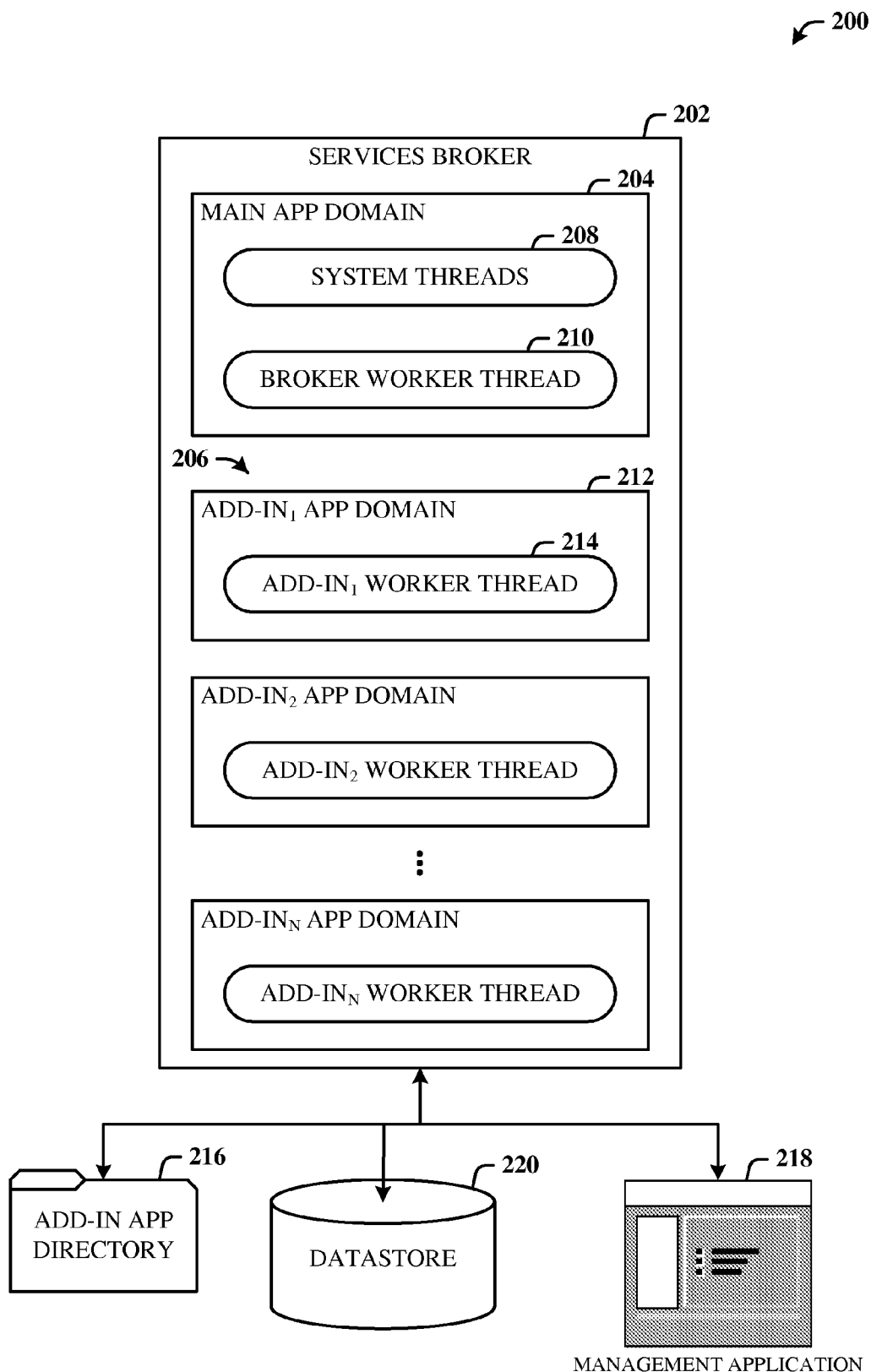
FIG. 2 illustrates an exemplary broker system for asynchronous execution of software tasks.

FIG. 2 illustrates an exemplary broker system 200 for asynchronous execution of software tasks. The system 200 includes a services broker 202 (similar to broker system 100) that can host multiple separate domains in which applications (or add-in services modules) can launch and execute commands and other related processes. For example, a main application domain 204 includes broker software that manages broker system processes and facilitates management of add-in domains 206 (denoted ADD-IN$_1$ APP DOMAIN, ..., ADD-IN$_N$ APP DOMAIN). In support of broker system processes and add-in management, the main domain 204 can run one or more broker system threads 208 as well as a broker worker thread 210 (e.g., for the scheduler and watch dog processes). The system thread 208 responds to system commands (e.g., stop/start) and configuration changes, for example.

Each of the add-in domains 206 can run one or more corresponding worker threads (denoted ADD-IN$_1$ WORKER THREAD, ..., ADD-IN$_N$ WORKER THREAD). For example, a first add-in application domain 212 can include an application (not shown) which can spawn one or more first add-in worker threads 214. A first application operating in the first add-in domain 212 runs independently of the other add-in applications in the other domains 206.

Add-in applications (or services) are retrieved and loaded from a designated add-in directory 216. The add-in directory 216 can include add-in binaries, which are retrieved and loaded into the add-in domains 206. Each add-in application is an assembly that exposes classes and methods for access by other software entities. These classes and methods can be labeled with command attributes for identifying each of the one or more actions supported by the respective add-in service.

The broker 202 (via the main domain application system thread 208 and/or broker worker thread 210) loads the add-in services and dynamically creates secured targets for each command of a service (or service action) being exposed. This facilitates authorization management (e.g., via a management application 218) to set access permissions for users and/or other system entities that will be permitted to execute the commands.

The service broker 202 receives requests for one or more of the add-in services (whether the add-ins are currently loaded and running in the broker, or unloaded and residing in the directory 216) and enqueues commands associated with the requests in a command queue, monitors the command queue, and executes commands according with the associated command schedules. The commands are queued up in a datastore 220 using a stored procedure that also performs the security checks to ensure the caller has the appropriate permissions to execute the command. The datastore 220 can persist and support the command queue, the running status of a command, error information about errors that may occur during add-in execution, broker operations, etc., and security roles for entities (e.g., users, other systems or objects).

With each run, the service broker main application updates status, error, and run-history tables. A command can be explicitly removed from the command queue (e.g., by the management application 218).

To ensure isolation between the add-in services and independent management capability, each add-in service is executed in its associated worker thread(s) and application domain. When a worker thread is not responding to a command (e.g., a stop command) the application domain in which the add-in service module is loaded is discarded, thereby ensuring the add-in service module will free-up locked resources that are currently dedicated to the service and software leaks that may currently be occurring.

In one implementation, the services broker 202 can be implemented as a Windows™ service with a SQL (structured query language) database (datastore 220) used as persisted storage. The services broker 202 can run as a Windows service under local system account and connect to the SQL server using Windows authentication.

As a brief, but not all-inclusive summary, the service broker 202 handles the loading of working module (the add-ins) and scheduling of service requests to the working modules from one or more clients. The functionalities of broker 202 include dynamically loading the working modules from a specified directory, publishing the functionalities (commands) provides by loaded services (or modules), receiving service requests from clients, and upon successful authentication and authorization, dispatching the requests to the command queue for scheduling and execution.

On startup, the broker initializes by loading one or more service modules, publishing (exposing) commands of the loaded modules, and starts the broker worker thread 210. In one implementation, only add-ins that have incoming requests are loaded at broker initialization. In another implementation, all known add-in modules are loaded at initialization. The loaded add-in modules are installed in the add-ins directory 216. All classes that have a command attribute are published. A mapping of modules+version+command+roles is stored in memory, and privileges are created and given to each role specified in the command attribute. For each service add-in module loaded in memory, a working thread and a queue are created. When the broker worker thread 210 feeds the queue with a command for a specific add-in module the associated thread will wake up and will execute the commands from the associated queue.

When the broker worker thread 210 starts, service requests are accepted from clients through the datastore 220 by reading all existing service commands and associated schedules from the datastore 220. The broker worker thread 210 dispatches the requests (upon successful authentication and authorization) to module working threads (e.g., worker thread 214). When the broker 202 sends a stop command, this stops the module worker threads (e.g., thread 214) and the broker worker thread 210. A pause command indicates that actions should not be executed while the service is paused. A continue command resets the pause command to allow the actions to continue. A shutdown command stops the module worker threads (e.g., thread 214) and the broker worker thread 210.

As indicated, the broker 202 can employ the management application 218 that includes a user interface (UI) for interacting with broker functionality. The management application 218 facilitates the invoking of operations, tasks, and commands via the service-specific actions that are applicable to the add-ins being executed. For example a commerce manager add-in can have actions such as download orders and upload items, where a business application add-in can have actions such as synchronize or send inventory adjustments.

The management application 218 can provide the UI for interactive user scheduling of the actions being invoked. This can also be accomplished automatically according to business rules, for example. The following options can be made available, with extensibility for allowing other types of schedules, if desired. The scheduling can be "on-demand" or immediately. Alternatively, scheduling can be invoked periodically according to a predetermined time (e.g., every twenty-four hours at 1 PM, every two minutes starting now, every seven days starting now plus five minutes, etc). Another scheduling option is to invoke execution when an idle time is detected, wherein the idle time is expected to be sufficient to nearly or completely accommodate the request execution. For example, scheduling can invoke a command, task, and/or operation when the CPU activity is less then (or about) a predetermined given threshold (e.g., when about two percent of the CPU time is devoted to other processes) for a given period of time (e.g., no more than ten minutes).

The UI of the application 218 facilitates checking the progress of an action that is occurring, and displaying errors that occur during the command execution. Results of an action can also be displayed. The type of result can vary depending on the action being executed. The UI of the application 218 can also be employed to specify which users are authorized to perform particular actions (e.g., a cashier might be able to download orders from a commerce manager but not to upload items) via role-based security.

The services broker 202 can dynamically load the add-in service modules that execute the actions and unload the modules when locked in executing a command for more then a given period of time (e.g., exceeding a timeout value). The service can be installed independently of other applications (e.g., the POS application). Additionally, the add-in service modules can be "sandboxed" one from another (the actions of one add-in do not affect the executions of another add-in). Each add-in responds to a Stop command that can be called by the broker service; if not, the broker service will interrupt execution of the module.

Figure 3:
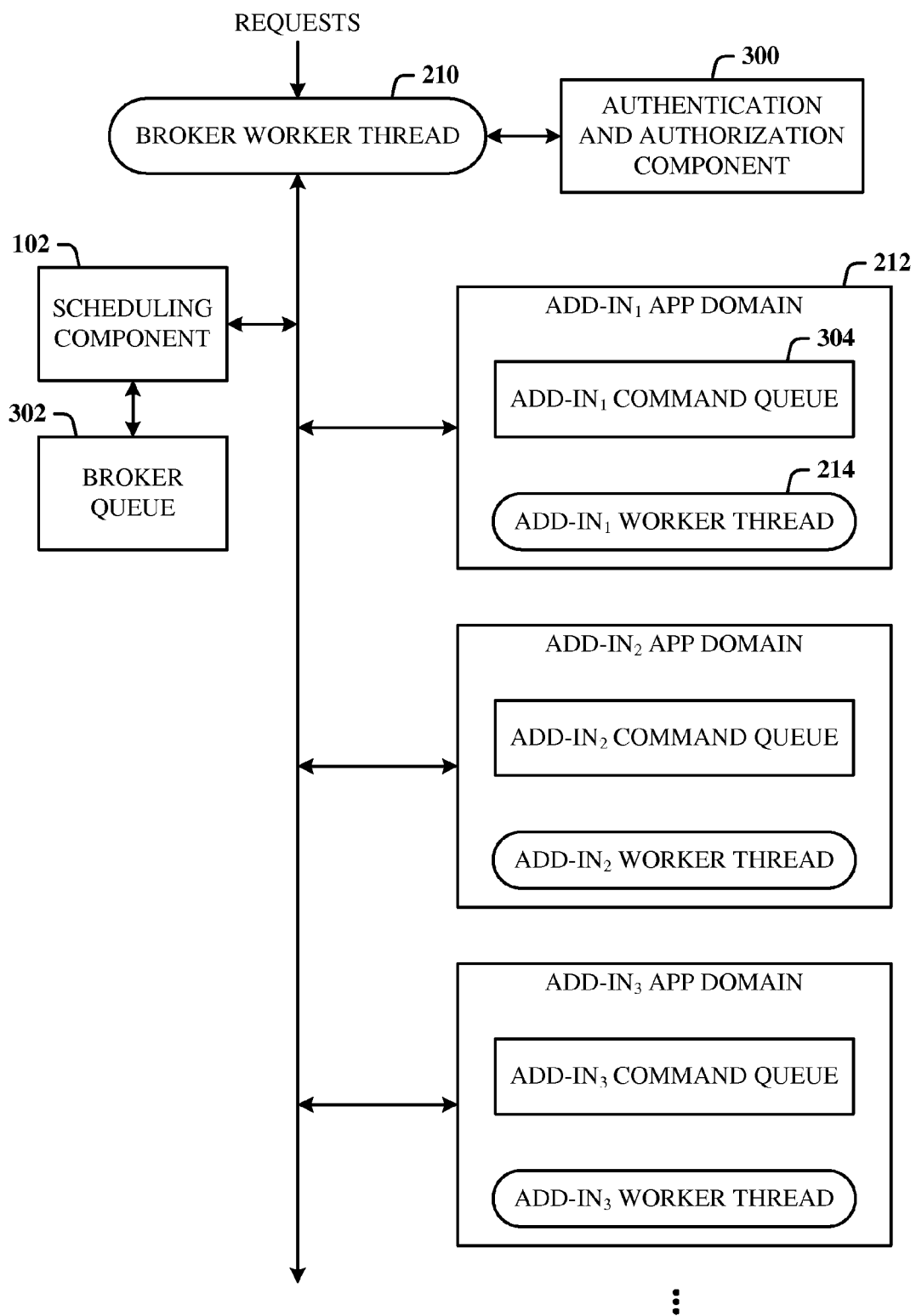
FIG. 3 illustrates one exemplary alternative flow for broker request processing in accordance with the disclosed architecture.

FIG. 3 illustrates one exemplary alternative flow for broker request processing in accordance with the disclosed architecture. After the broker initializes and all add-in modules publish commands, the broker begins to receive and process requests from internal and/or external clients. More specifically, when the broker worker thread 210 receives a request, the request is processed through an authentication and authorization component 300 to determine what permissions, if any, should be allowed the request. If allowed some level of access, the broker worker thread 210 sends one or more commands associated with the request to the appropriate add-in module(s) where the commands are queued for execution. When a command is queued in an add-in domain, the associated add-in worker thread senses the "job" in the queue, "awakens" and loads the corresponding service which then executes the command. The fact that this apparently occurred immediately indicates that the request could have been configured for on-demand processing. In other words, requests can be handled asynchronously for processing, in response to which the appropriate add-in service is made available.

The request can also be designated for scheduling. It is to be understood that the on-demand request is scheduled as well, just that the on-demand is scheduled for attention immediately, rather than at a later time. If a request is designated for scheduling, the request is passed from the broker worker thread 210 to the scheduling component 102 where the request can be queued in a broker queue 302. When the appropriate time occurs, all request queued for that time will be processed through the broker worker thread 210 to the appropriate add-in command queue.

For example, if a first request processed through the broker worker thread is an on-demand request, the request is processed through the authentication/authorization component 300, and when cleared, assigned access permissions and forwarded to the first add-in command queue 304 of the first add-in application domain 212. The first add-in worker thread 214 senses the request in the first queue 304, awakens the service (if needed), and executes the first request. Once the processing of the first request has completed, the first worker thread 214 can be configured to wait for a predetermined time before shutting down (or unloading). Alternatively, the broker worker thread 210 can sense that no other requests are designated for the first add-in application domain 212, and then unload the first add-in module to minimize overhead management processing. Thus, the broker worker thread 210 will stuff add-in queues with commands as requested and scheduled.

It is possible that a request can spawn more than one command such that request processing by the broker worker thread 210 schedules one command for immediately execution and another command for later processing according to the scheduling component 102.

It also within contemplation that the each domain can have a separate scheduler such that the broker worker thread 210, after performing the security operation on a request, sends the request to the local add-in domain schedulers for caching and processing according to scheduled times (e.g., immediate, periodical, during idle times, etc.). This can further reduce management overhead at least with respect to the service broker.

The broker can also manage loading or excessive add-in processing by limiting the number of add-in that can execute at any given time. For example, if it known that the broker system 202 begins to degrade in performance at eleven simultaneously executing add-in modules, and a request exists for an eleventh module, the broker can unload the first-available idle add-in (of the ten), and upload the required eleventh module (in the tenth "slot") for processing. This can occur dynamically as well.

Figure 4:
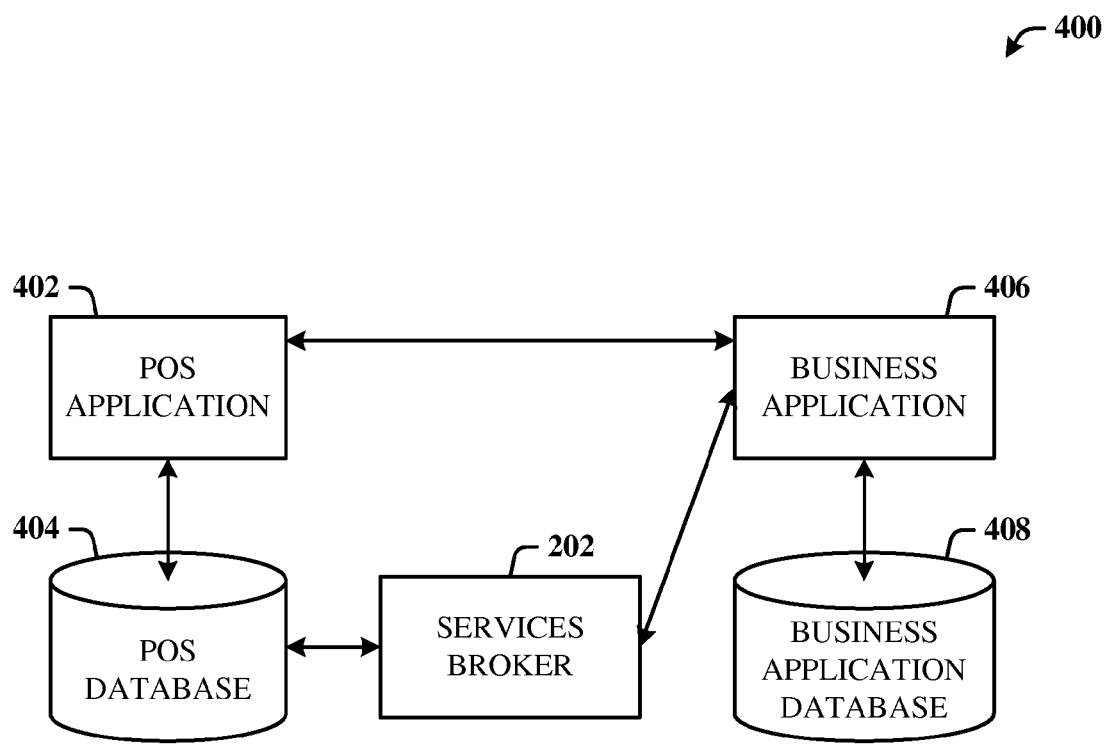
FIG. 4 illustrates an exemplary business system in which the services broker can be employed.

FIG. 4 illustrates an exemplary business system 400 in which the services broker 202 can be employed. The broker 202 is employed with a point-of-sale (POS) application 402, POS database 404, business application 406 and business database 408. The broker 202 can obtain POS data and configuration information from the POS database 404, based on, for example, requests received from the business application 406. The business application 406 may choose to exercise processes at scheduled times, intervals, etc., by sending requests to the broker 202. The broker 202 can then load the associated add-in service(s), expose the classes and/or methods, which when executed access the POS database 404 or other system entities (not shown).

The system 400 can be employed on a single computer system. Alternatively, the POS subsystem (application 402 and database 404) can be on one machine, the services broker 202 on a second machine, and the business system (business application 406 and database 408) on a third machine. Thus, there is support for legacy systems such that the broker 202 is sufficiently extensible to dynamically load "legacy" add-in modules designed for compatibility with legacy systems.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
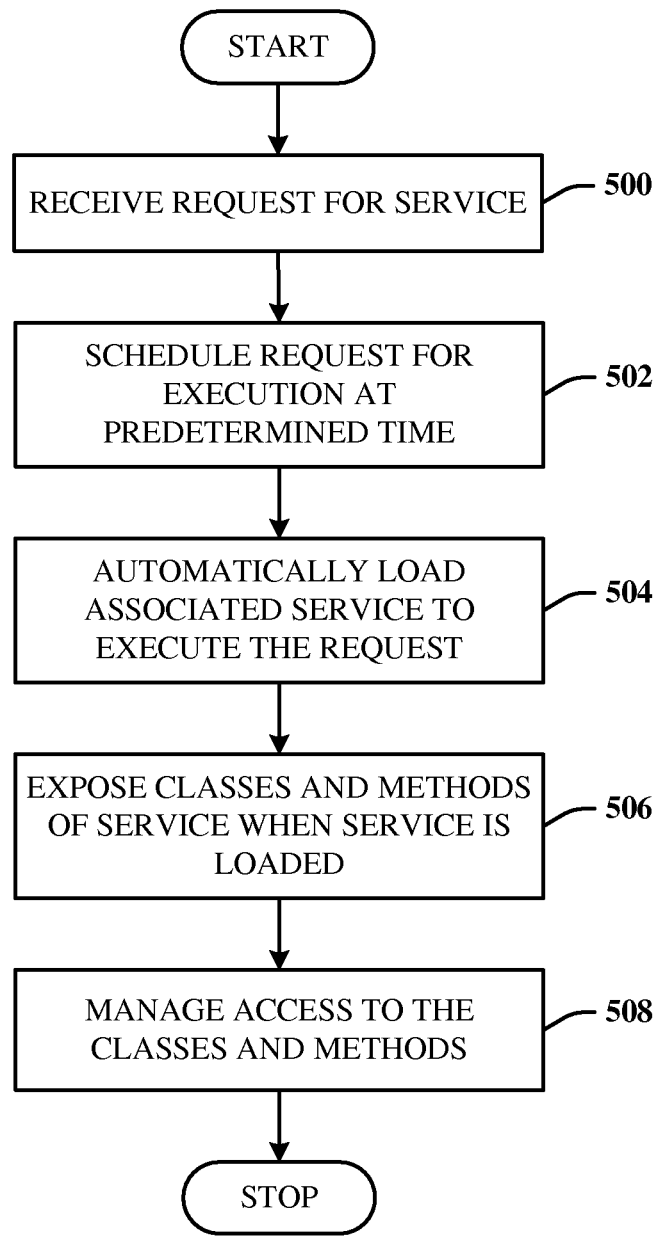
FIG. 5 illustrates a computer-implemented method of brokering services in accordance with the disclosed architecture.

FIG. 5 illustrates a computer-implemented method of brokering services in accordance with the disclosed architecture. At 500, a request for a service is received. At 502, the request is scheduled for execution at a predetermined time. At 504, the associated service is automatically loaded to execute the request. At 506, classes and methods of the service are exposed when the service is loaded. At 508, access to the classes and methods is managed.

Figure 6:
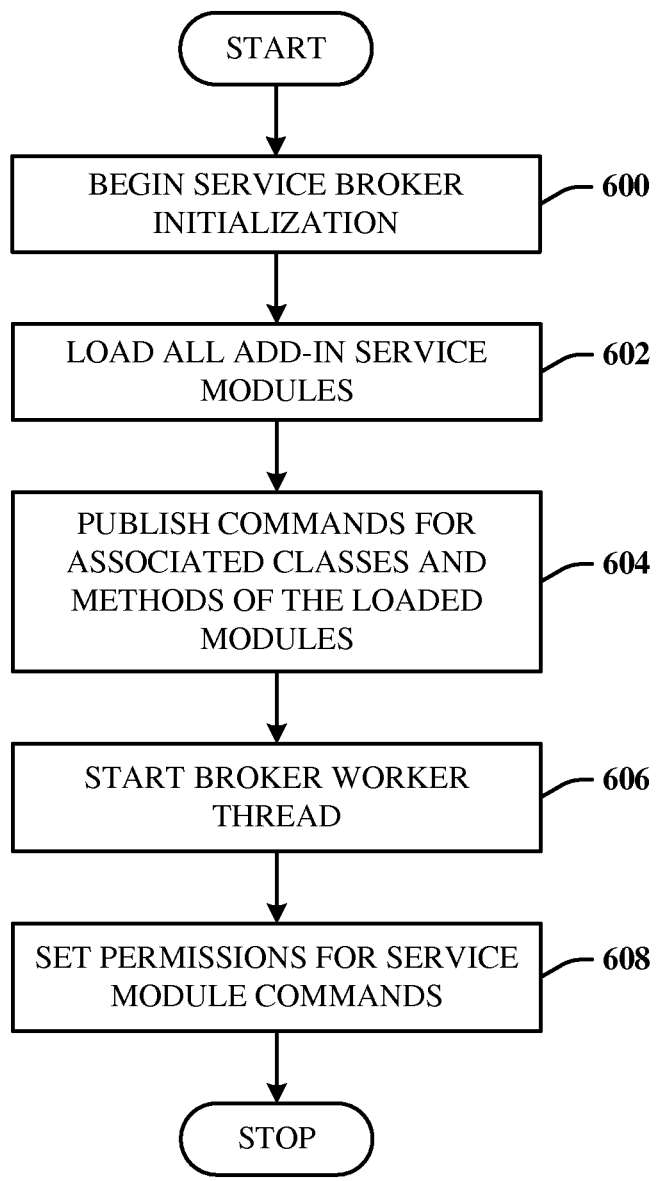
FIG. 6 illustrates an alternative method of brokering services.

FIG. 6 illustrates an alternative method of brokering services. At 600, begin service broker initialization. At 602, all service add-in modules are loaded. At 604, commands associated with classes and methods of the loaded modules are published. At 606, the broker worker thread is started. At 608, permissions for the published commands are set.

Figure 7:
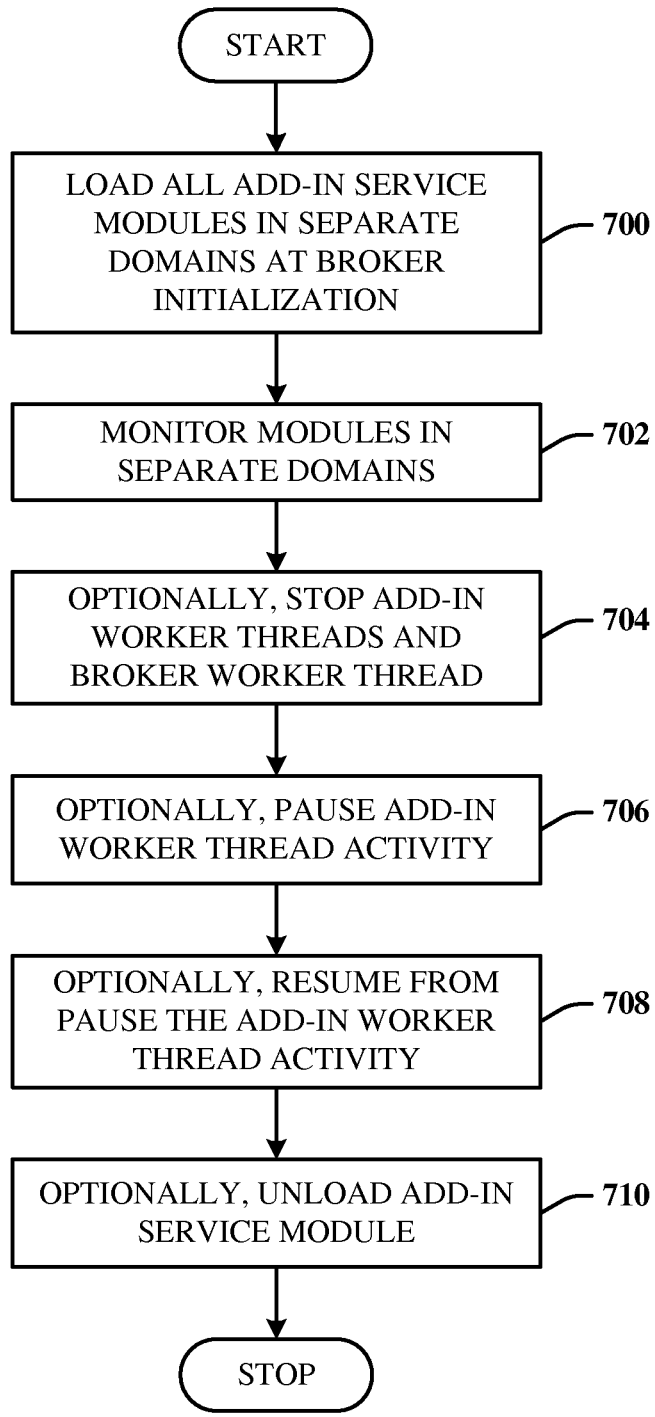
FIG. 7 illustrates a method of managing broker and add-in service modules.

FIG. 7 illustrates a method of managing broker and add-in service modules. At 700, at broker initialization all add-in modules are loaded in separate domains, commands published, and the broker worker thread started. At 702, the broker monitors all add-in modules in the separate domains. At 704, optionally, the broker service can stop add-in worker threads and the broker worker thread. At 706, optionally, the broker service can pause one or more add-in worker thread activity. At 708, optionally, the broker service can resume-from-pause the one or more add-in worker threads. At 710, optionally, the broker service can unload one or more add-in service modules entirely.

Figure 8:
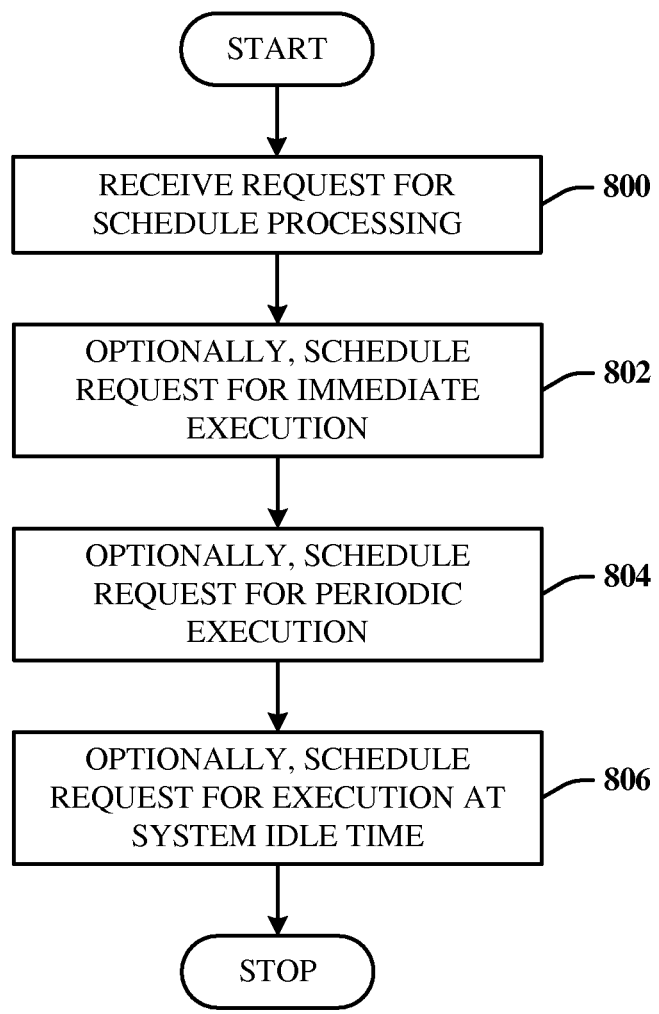
FIG. 8 illustrates a method of scheduling requests for asynchronous execution.

FIG. 8 illustrates a method of scheduling requests for asynchronous execution. At 800, a request is received for schedule processing. At 802, optionally, the broker service schedules the request for immediate execution by the corresponding add-in service module. At 804, optionally, the broker service schedules the request for periodic execution (e.g., every week at midnight). At 806, optionally, the broker service schedules the request for execution at a time when the broker system is at an idle time. It is to be appreciated that other scheduling schemes can be employed, such as prioritizing one request over another if there would be an impact on system behavior or performance.

Figure 9:
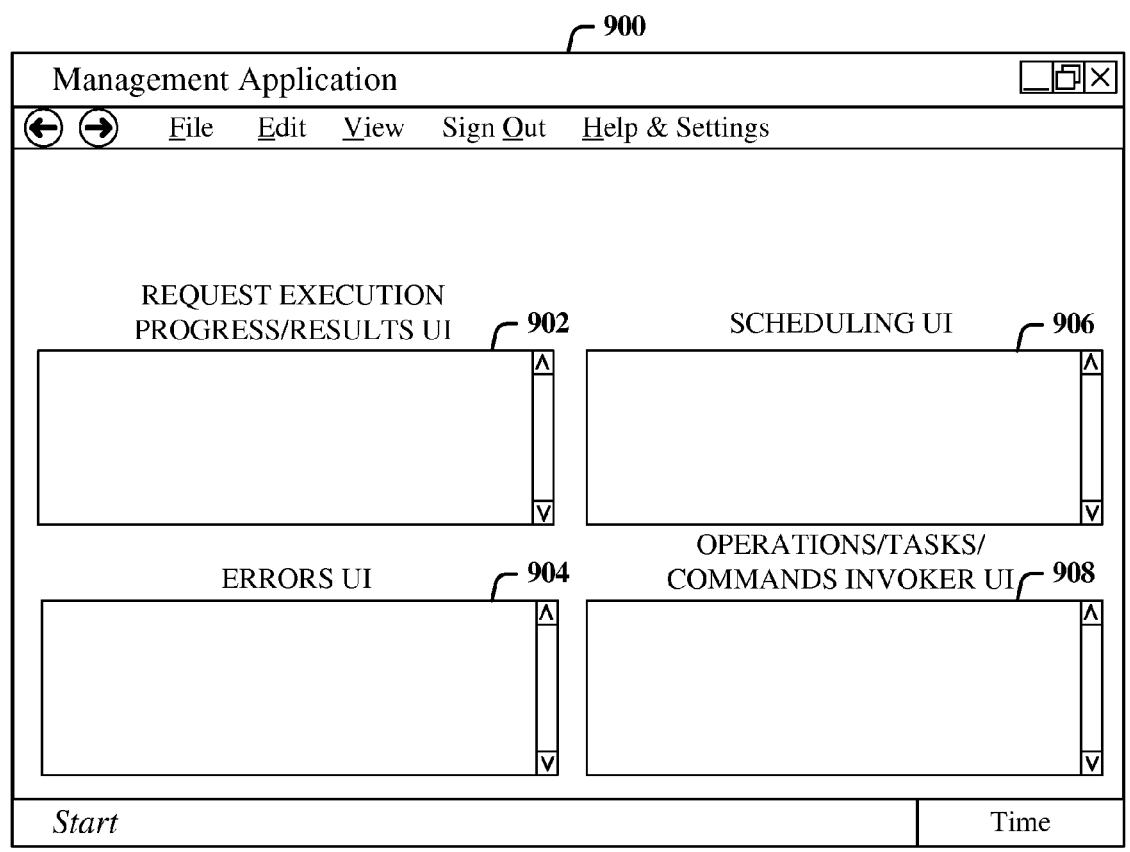
FIG. 9 illustrates an exemplary management application user interface via which a user can interact to manage and view broker operations.

FIG. 9 illustrates an exemplary management application user interface (UI) 900 via which a user can interact to manage and view broker operations. The UI 900 can be a browser interface that presents broker information in one or more UIs. For example, a first UI 902 can present requested execution progress results, a second UI 904 can present errors generated during process execution (e.g., system level and/or add-in level), a scheduling UI 906 for manually scheduling requests and/or viewing automatically scheduled requests, and an invoker UI 908 for invoking commands, tasks, and/or operations. It is to be understood that other panels and UIs can be provided, and in different formats, etc.

Figure 10:
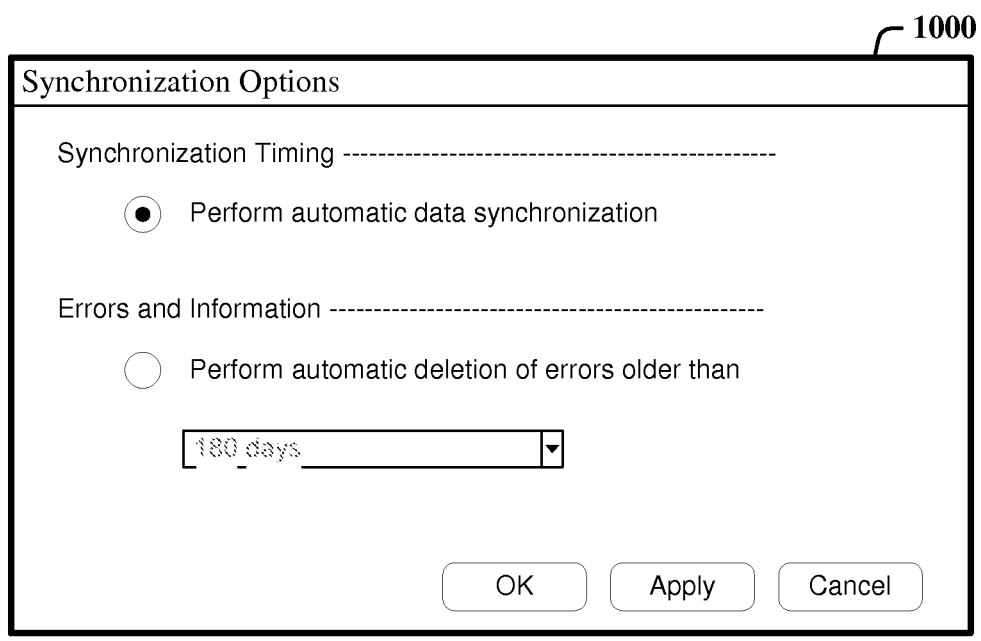
FIG. 10 illustrates an exemplary synchronization options panel.

FIG. 10 illustrates an exemplary synchronization options panel 1000. The panel 1000 offers a selection for automatic data synchronization and a selection for automatically aging errors for the system.

FIG. 11 illustrates an exemplary synchronization status panel 1100. The panel 1100 presents status information for objects such as customers, items, suppliers, and transactions, for example. An option is also provided for viewing an error report and selecting objects for immediate data synchronization.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 12:
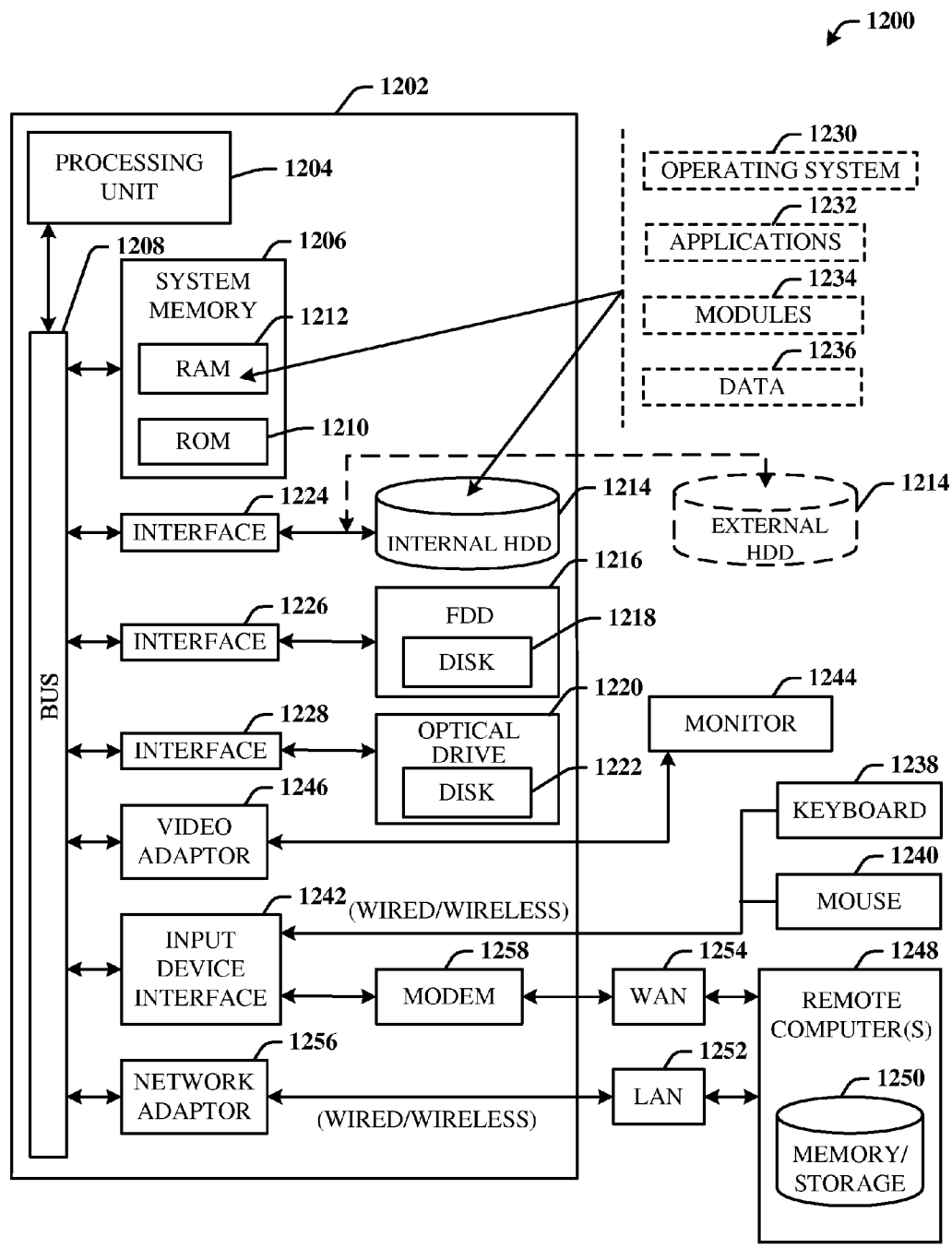
FIG. 12 illustrates a block diagram of a computing system operable to execute asynchronous execution of software in accordance with the disclosed architecture.

Referring now to FIG. 12, there is illustrated a block diagram of a computing system 1200 operable to execute asynchronous execution of software in accordance with the disclosed architecture. In order to provide additional context for various aspects thereof, FIG. 12 and the following discussion are intended to provide a brief, general description of a suitable computing system 1200 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the exemplary computing system 1200 for implementing various aspects includes a computer 1202, the computer 1202 including a processing unit 1204, a system memory 1206 and a system bus 1208. The system bus 1208 provides an interface for system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The HDD 1214, FDD 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1212, including an operating system 1230, one or more application programs 1232, other program modules 1234 and program data 1236. The operating system 1230, one or more application programs 1232, other program modules 1234 and program data 1236 can include the scheduling component 102, services component 104, management component 106, services broker 202 and subcomponents (e.g., domain 204, domain 206) directory 216, application 218, authentication component 300, broker queue 302, and so on.

All or portions of the operating system, applications, modules, and/or data can also be cached in the RAM 1212. It is to be appreciated that the disclosed architecture can be implemented with various commercially available operating systems or combinations of operating systems.

A user can enter commands and information into the computer 1202 through one or more wire/wireless input devices, for example, a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wire and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 may facilitate wire or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented services broker system, comprising:
   one or more processors operatively coupled to one or more memories, the one or more memories storing:
      a scheduling component for scheduling requests for add-in services;
      a services component for automatically invoking at least one of the add-in services in response to a service request; and
      a management component for:
         loading one or more working modules for invoking the at least one of the add-in services based on predetermined business rules, and setting access permissions on execution of commands of the working modules based on a permission level of the service request, wherein the permission level of the service request is based on a role of an entity generating the service request;
         exposing classes and methods of the one or more working modules when the one or more working modules are loaded, including exposing the commands associated with the classes and methods of the one or more working modules; and
         enabling execution of at least one command associated with the exposed classes and methods of the one or more working modules corresponding to the permission level of the service request.

2. The system of claim 1, wherein the scheduling component schedules a request on-demand.

3. The system of claim 1, wherein the service-specific actions facilitate execution of operations, tasks and commands associated with a service.

4. The system of claim 1, wherein the management component includes a user interface for interactively requesting and viewing progress of an action.

5. The system of claim 1, wherein the management component includes a user interface for interactively viewing a result of an action.

6. The system of claim 1, wherein the management component includes a user interface for interactively viewing an error associated with execution of a command.

7. The system of claim 1, wherein the services component dynamically manages excessive service processing by unloading at least one idle working module from the one or more working modules when performance of the system begins to degrade as a result of excessive service processing.

8. The system of claim 1, wherein the management component includes a user interface for interactively managing access to an action to be performed.

9. The system of claim 1, wherein the management component publishes functionalities provided by the loaded modules.

10. The system of claim 1, wherein the services component dynamically manages service processing by unloading a working module from the one or more working modules when a working module is locked in executing a command for more than a predetermined time.

11. A computer-implemented method of brokering services, comprising:
   receiving a request for one or more services;
   scheduling the request for execution at a predetermined time;
   automatically loading the one or more services to execute the request based on predetermined business rules and setting access permissions on execution of commands of the one or more services based on a permission level of the one or more services request;
   exposing classes and methods of the one or more services when the one or more services are loaded, including exposing the commands associated with the classes and methods of the one or more services;
   enabling execution of at least one command associated with the exposed classes and methods of the one or more services corresponding to the permission level of the one or more services request; and
   unloading the loaded one or more services after a predetermined time upon completing the execution;
   wherein the permission level of the one or more services request is based on a role of an entity generating the one or more services request.

12. The method of claim 11, further comprising enqueuing commands for executing the classes and methods and executing the at least one command according to a scheduled time.

13. The method of claim 11, further comprising explicitly removing a command associated with a class or a method from a command queue.

14. The method of claim 11, further comprising updating status, error, and run-history tables for each run of the service.

15. The method of claim 11, further comprising discarding an application domain in which the service is loaded when a thread of the service fails to respond to a stop command.

16. The method of claim 11, wherein the loaded working services are sandboxed to operate independently without affecting one another.

17. The method of claim 11, wherein the predetermined time is one of immediately upon receiving of the request, periodically at a given time, or when system processes are reduced.

18. A tangible computer-readable memory bearing computer-executable instructions which, when executed by a computer system comprising at least a processor, carry out a method of brokering services in response to receiving a request for one or more services, the method comprising:
  scheduling the request for execution at a predetermined time;
  automatically loading the one or more services to execute the request based on predetermined business rules, and setting access permissions on execution of commands of the one or more services based on a permission level of the one or more services request;
  exposing classes and methods of the one or more services when the one or more services are loaded, including exposing the commands associated with the classes and methods of the one or more services; and
  enabling execution of at least one command associated with the exposed classes and methods of the one or more services corresponding to the permission level of the one or more services request;
  wherein the permission level of the one or more services request is based on a role of an entity generating the one or more services request.

19. The computer-readable memory of claim 18, where the method further comprises enqueuing commands for executing the classes and methods and executing the at least one command according to a scheduled time.

20. The computer-readable memory of claim 18, where the method further comprises explicitly removing a command associated with a class or a method from a command queue.

* * * * *